United States Patent
Qiu et al.

(10) Patent No.: US 10,785,232 B2
(45) Date of Patent: Sep. 22, 2020

(54) METHOD, APPARATUS, SYSTEM, AND ELECTRONIC DEVICE FOR CROSS-BLOCKCHAIN INTERACTION

(71) Applicant: Alibaba Group Holding Limited, George Town (KY)

(72) Inventors: Honglin Qiu, Hangzhou (CN); Huabing Du, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/725,715

(22) Filed: Dec. 23, 2019

(65) Prior Publication Data

US 2020/0145431 A1 May 7, 2020

Related U.S. Application Data

(63) Continuation of application No. 16/287,750, filed on Feb. 27, 2019.

(30) Foreign Application Priority Data

Feb. 27, 2018 (CN) .......................... 2018 1 0162070

(51) Int. Cl.
*H04L 29/06* (2006.01)
*H04L 9/06* (2006.01)
(Continued)

(52) U.S. Cl.
CPC .............. *H04L 63/12* (2013.01); *G06Q 40/04* (2013.01); *H04L 9/0637* (2013.01);
(Continued)

(58) Field of Classification Search
CPC .......... G06Q 10/08; G06Q 40/08; H04L 9/06; H04L 9/08; H04L 9/0891; H04L 9/12;
(Continued)

(56) References Cited

U.S. PATENT DOCUMENTS

2017/0031676 A1\* 2/2017 Cecchetti .............. H04L 9/0891
2017/0046652 A1\* 2/2017 Haldenby ............ G06Q 20/367
(Continued)

FOREIGN PATENT DOCUMENTS

| CN | 104092767 | 10/2014 |
|---|---|---|
| CN | 106991164 | 7/2017 |

(Continued)

OTHER PUBLICATIONS

Buterin, Squarespace.com [online], "Chain Interoperability," Sep. 2016, [retrieved on Jul. 8, 2019], retrieved from: URL<https://static1.squarespace.com/static/55f73743e4b051cfcc0b02cf/t/5886800ecd0f68de303349b1/1485209617040/Chain%20Interoperability.pdf, 25 pages.
(Continued)

*Primary Examiner* — Thanhnga B Truong
(74) *Attorney, Agent, or Firm* — Fish & Richardson P.C.

(57) ABSTRACT

This specification describes techniques for performing cross-blockchain interactions. One example method includes generating, by a blockchain node in a first blockchain, a subscription request to a cross-chain interaction end between the first blockchain and a second blockchain. The blockchain node can then obtain a message from the second blockchain based on the subscription request, and subsequently perform an operation related to the obtained message. In some instances, the message obtained by the blockchain node is a message that is published in the second blockchain and satisfies subscription conditions of the blockchain node.

19 Claims, 14 Drawing Sheets

(51) Int. Cl.
  *H04L 29/08* (2006.01)
  *G06Q 40/04* (2012.01)
(52) U.S. Cl.
  CPC ............ *H04L 67/141* (2013.01); *H04L 67/26* (2013.01); *H04L 67/32* (2013.01); *H04L 2209/38* (2013.01)
(58) Field of Classification Search
  CPC ......... H04L 9/3236; G06F 9/445; G06F 8/65; G06F 21/64
  See application file for complete search history.

(56) References Cited

U.S. PATENT DOCUMENTS

| | | | |
|---|---|---|---|
| 2018/0189755 | A1 | 7/2018 | Kilpatrick et al. |
| 2018/0203992 | A1 | 7/2018 | Kilpatrick |
| 2018/0220292 | A1 | 8/2018 | Landscheidt |
| 2018/0294966 | A1 | 10/2018 | Hyun et al. |
| 2019/0050854 | A1 | 2/2019 | Yang et al. |
| 2019/0268351 | A1 | 8/2019 | Qiu et al. |

FOREIGN PATENT DOCUMENTS

| | | |
|---|---|---|
| CN | 107301536 | 10/2017 |
| TW | 1610562 | 1/2018 |
| TW | 1610567 | 1/2018 |
| WO | WO 2018126065 | 7/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Gijtenbeek et al. [online], "An Analysis of Atomic Swaps on and Between Ethereum Blockchains Using Smart Contracts," Feb. 2018, [retrieved on Jul. 8, 2019], retrieved from: URL<https://homepages.staff.os3.nl/~delaat/rp/2017-2018/p42/report.pdf>, 26 pages.

Herlihy, "Atomic Cross-Chain Swaps," Cornell University Library, 2018, XP080855451, 17 pages.

International Search Report and Written Opinion in International Application No. PCT/US2019/019520, dated Apr. 16, 2019, 14 pages.

Nakamoto, "Bitcoin: A Peer-to-Peer Electronic Cash System," www.bitcoin.org, 2005, 9 pages.

Narayanan et al., Cloudfront.net [online], "Bitcoin and Cryptocurrency Technologies," Feb. 2016, [retrieved on Jul. 8, 2019], retrieved from: URL<https://d28rh4a8wq0iu5.cloudfront.net/bitcointech/readings/princeton_bitcoin_book.pdf>, 308 pages.

Wikipedia.org [online], "Message Queue," Feb. 2018, [retrieved on Apr. 5, 2019], retrieved from: URL<https://en.wikipedia.org/w/index.php?title=Message_queue&oldid=824236894>, 6 pages.

International Preliminary Report on Patentability in International Application No. PCT/US2019/019520, dated Jun. 18, 2020, 16 pages.

\* cited by examiner

METHOD, APPARATUS, SYSTEM, AND ELECTRONIC DEVICE FOR CROSS-BLOCKCHAIN INTERACTION

CROSS-REFERENCE TO RELATED APPLICATIONS

This application is a continuation of U.S. application Ser. No. 16/287,750, filed on Feb. 27, 2019, which claims priority to Chinese Patent Application No. 201810162070.5, filed on Feb. 27, 2018, each of which is hereby incorporated by reference in its entirety.

TECHNICAL FIELD

One or more implementations of the present specification relate to the field of the blockchain technology, and in particular, to a method, apparatus, system, and electronic device for cross-blockchain interaction.

BACKGROUND

The blockchain technology (also referred to as a distributed ledger technology) is a decentralized distributed database technology. The blockchain technology is decentralized, open, tamper-proof, and trustworthy, and can be applied to many application scenarios that have a high requirement for data reliability.

SUMMARY

In view of this, one or more implementations of the present specification provide a method, apparatus, system, and electronic device for cross-blockchain interaction.

To achieve the previous objective, one or more implementations of the present specification provide the following technical solutions:

According to a first aspect of one or more implementations of the present specification, a system for cross-blockchain interaction is provided, including: a first blockchain and a second blockchain; a subscription client, where the subscription client corresponds to a blockchain node in the first blockchain, and is configured to maintain a message queue corresponding to the blockchain node, where the message queue includes messages that the blockchain node subscribes to; a publishing client, where the publishing client corresponds to the second blockchain, and is configured to obtain and publish a message generated in the second blockchain; and a cross-chain interaction end, where the cross-chain interaction end obtains subscription conditions of the blockchain node, and when the message queue does not include a message satisfying the subscription conditions, requests the message satisfying the subscription conditions from the publishing client and sends the message to the subscription client, to update the message to the message queue.

According to a second aspect of one or more implementations of the present specification, a method for cross-blockchain interaction is provided, including: obtaining, by a blockchain node in a first blockchain, a message in a second blockchain by using a cross-chain interaction end between the first blockchain and the second blockchain; and executing, by the blockchain node, an operation related to the message.

According to a third aspect of one or more implementations of the present specification, a method for cross-blockchain interaction is provided, including: obtaining, by a subscription client by using a cross-chain interaction end between a first blockchain and a second blockchain, a message published in the second blockchain, where the message satisfies subscription conditions provided by a blockchain node in the first blockchain to the cross-chain interaction end; and providing, by the subscription client, the message to the blockchain node.

According to a fourth aspect of one or more implementations of the present specification, a method for cross-blockchain interaction is provided, including: obtaining, by a cross-chain interaction end, a subscription request initiated by a blockchain node in a first blockchain, where the subscription request includes subscription conditions; and obtaining, by the cross-chain interaction end, a message in a second blockchain that satisfies the subscription conditions, to provide the message to the blockchain node.

According to a fifth aspect of one or more implementations of the present specification, a method for cross-blockchain interaction is provided, including: obtaining, by a publishing client, a message in a second blockchain; and sending, by the publishing client, the message to a blockchain node in a first blockchain by using a cross-chain interaction end between the first blockchain and the second blockchain.

According to a sixth aspect of one or more implementations of the present specification, an apparatus for cross-blockchain interaction is provided, including: an acquisition unit, enabling a blockchain node in a first blockchain to obtain a message in a second blockchain by using a cross-chain interaction end between the first blockchain and the second blockchain; and an execution unit, enabling the blockchain node to execute an operation related to the message.

According to a seventh aspect of one or more implementations of the present specification, an apparatus for cross-blockchain interaction is provided, including: a message acquisition unit, enabling a subscription client to obtain, by using a cross-chain interaction end between a first blockchain and a second blockchain, a message published in the second blockchain, where the message satisfies subscription conditions provided by a blockchain node in the first blockchain to the cross-chain interaction end; and a message providing unit, enabling the subscription client to provide the message to the blockchain node.

According to an eighth aspect of one or more implementations of the present specification, an apparatus for cross-blockchain interaction is provided, including: an acquisition unit, enabling a cross-chain interaction end to obtain a subscription request initiated by a blockchain node in a first blockchain, where the subscription request includes subscription conditions; and a providing unit, enabling the cross-chain interaction end to obtain a message in a second blockchain that satisfies the subscription conditions, to provide the message to the blockchain node.

According to a ninth aspect of one or more implementations of the present specification, an apparatus for cross-blockchain interaction is provided, including: an acquisition unit, enabling a publishing client to obtain a message in a second blockchain; and a sending unit, enabling the publishing client to send the message to a blockchain node in a first blockchain by using a cross-chain interaction end between the first blockchain and the second blockchain.

According to a tenth aspect of one or more implementations of the present specification, an electronic device is provided, including: a processor; and a memory, configured to store an instruction that can be executed by the processor, where the processor is configured to implement the method according to any one of the previous implementations.

DESCRIPTION OF IMPLEMENTATIONS

Example implementations are described in detail here, and examples of the implementations are presented in the accompanying drawings. When the following description relates to the accompanying drawings, unless specified otherwise, same numbers in different accompanying drawings represent same or similar elements. Implementations described in the following example implementations do not represent all implementations consistent with one or more implementations of the present specification. On the contrary, the implementations are only examples of apparatuses and methods that are described in the appended claims in detail and that are consistent with some aspects of one or more implementations of the present specification.

It is worthwhile to note that, in other implementations, steps of a corresponding method are not necessarily performed in an order shown and described in the present specification. In some other implementations, the method can include steps more or fewer than the steps described in the present specification. In addition, a single step described in the present specification can be divided into a plurality of steps for description in another implementation, and a plurality of steps described in the present specification can be combined into a single step for description in another implementation.

Figure 1:
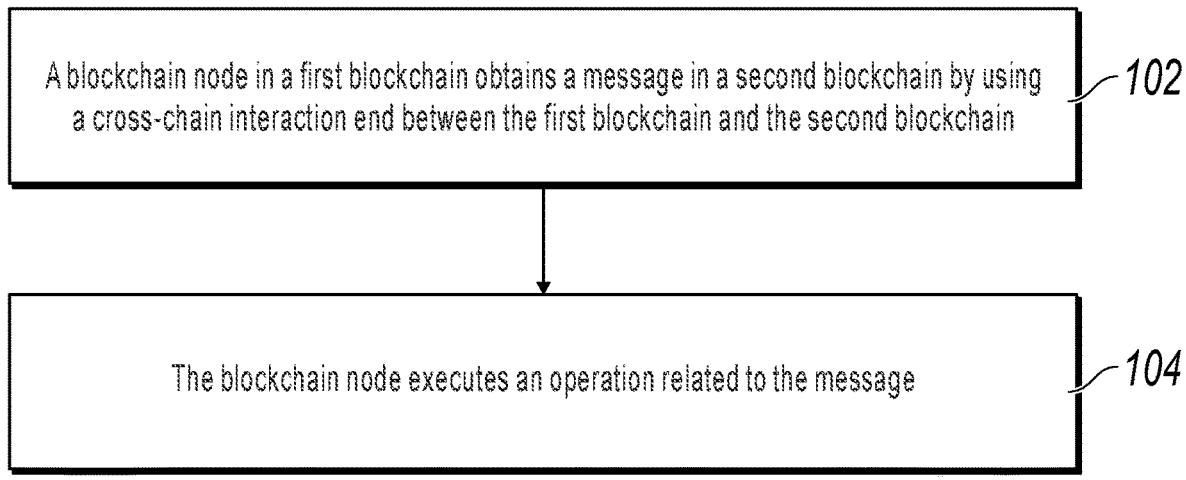
FIG. 1 is a flowchart illustrating a method for cross-blockchain interaction, according to an example implementation.

FIG. 1 is a flowchart illustrating a method for cross-blockchain interaction, according to an example implementation. As shown in FIG. 1, the method is applied to a blockchain node in a first blockchain, and can include the steps below.

Step 102. The blockchain node in the first blockchain obtains a message in a second blockchain by using a cross-chain interaction end between the first blockchain and the second blockchain.

In an implementation, the cross-chain interaction end is disposed between the first blockchain and the second blockchain, so that messages can be exchanged between the first blockchain and the second blockchain based on the cross-chain interaction end, to implement cross-chain interaction among a plurality of blockchains.

In an implementation, the first blockchain represents a party receiving a message in a cross-chain interaction, and the second blockchain represents a party providing a message in a cross-chain interaction. That is, the "first blockchain" and the "second blockchain" depend on roles played by corresponding blockchains in a cross-chain interaction process, and a certain blockchain is not limited to the first blockchain or the second blockchain. In other words, when a certain blockchain receives a message from another blockchain in a cross-chain interaction, the certain blockchain is the "first blockchain" in the cross-chain interaction process. When the certain blockchain provides a message to another blockchain in a cross-chain interaction, the certain blockchain is the "second blockchain" in the cross-chain interaction process.

In an implementation, the message obtained by the blockchain node includes a message that is published in the second blockchain and satisfies subscription conditions of the blockchain node. For example, assume that user A needs to transfer asset 1 to user B in the second blockchain, and user B needs to transfer asset 2 to user A in the first blockchain. First, an operation that user A transfers asset 1 to user B is executed in the second blockchain. Next, after an operation complete message corresponding to the operation is received in the first blockchain, an operation that user B transfers asset 2 to user A is executed in the first blockchain. In the asset transfer process between user A and user B, the subscription condition of the blockchain node in the first blockchain can be "user A transfers asset 1 to user B". Therefore, a message that needs to be obtained by the blockchain node is "user A transfers asset 1 to user B" published in the second blockchain. As such, the blockchain node is triggered to execute an operation related to the message, namely, the operation that user B transfers asset 2 to user A.

In an implementation, the blockchain node can initiate a subscription request to the cross-chain interaction end. The subscription request is used to indicate subscription conditions to the cross-chain interaction end, so that the cross-chain interaction end obtains a message that is published in the second blockchain and satisfies the subscription conditions, to add the message to a message queue maintained by a subscription client corresponding to the blockchain node. Then, the blockchain node obtains the message in the message queue. The subscription conditions are provided to the cross-chain interaction end, and the cross-chain interaction end obtains the message satisfying the subscription conditions. It helps coordinate a large quantity of blockchain nodes in a blockchain, so that subscription conditions of all blockchain nodes can be satisfied by the cross-chain interaction end.

Step 104. The blockchain node executes an operation related to the message.

In an implementation, the blockchain node can initiate a contract operation related to the obtained message, to complete the operation related to the message when the contract operation takes effect.

Figure 2:
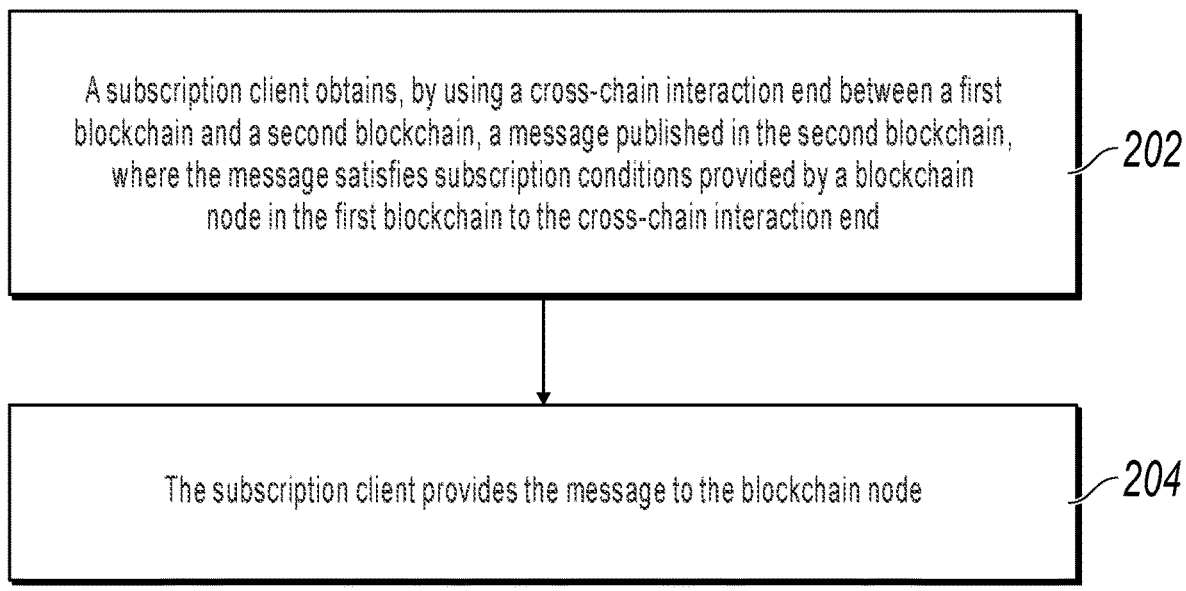
FIG. 2 is a flowchart illustrating another method for cross-blockchain interaction, according to an example implementation.

FIG. 2 is a flowchart illustrating another method for cross-blockchain interaction, according to an example implementation. As shown in FIG. 2, the method is applied to a subscription client, and can include the steps below.

Step 202. The subscription client obtains, by using a cross-chain interaction end between a first blockchain and a second blockchain, a message published in the second blockchain, where the message satisfies subscription conditions provided by a blockchain node in the first blockchain to the cross-chain interaction end.

In an implementation, the subscription client can be configured on the blockchain node, that is, the subscription client can be understood as a message subscription function that is implemented or extended on the blockchain node. In another implementation, the subscription client can be configured on another node independent of the first blockchain. No limitation is imposed in the present specification.

Step 204. The subscription client provides the message to the blockchain node.

In an implementation, the subscription client can add the obtained message to a message queue, and the message queue corresponds to the blockchain node, so that the blockchain node obtains the message from the message queue.

In an implementation, there is a one-to-one mapping relationship between subscription clients and blockchain nodes, so that the cross-chain interaction end can map a message to a corresponding blockchain node based on a subscription client, to ensure accurate message delivery. In another implementation, one subscription client can correspond to a plurality of blockchain nodes. For example, the subscription client can maintain a plurality of message queues that have a one-to-one mapping relationship with the plurality of blockchain nodes, to map a message to a corresponding blockchain node by using a message queue.

In an implementation, the subscription client can maintain a queue status of the message queue based on a message updated by the cross-chain interaction end to the message queue and a consumption status of each message in the message queue by the blockchain node, to indicate a message included in the message queue. Then, the subscription client can send the queue status to the cross-chain interaction end, so that the cross-chain interaction end determines, based on the queue status, whether the message queue includes a message satisfying the subscription conditions. When the message queue includes a message satisfying the subscription conditions, the cross-chain interaction end does not need to repeatedly obtain the message. When the message queue does not include a message satisfying the subscription conditions, the cross-chain interaction end can obtain the message that is published in the second blockchain and satisfies the subscription conditions, to update the message to the message queue.

In an implementation, the subscription client can receive a status query request initiated by the cross-chain interaction end. In response to the status query request, the subscription client returns the queue status to the cross-chain interaction end. In other words, both the message queue and the queue status of the message queue are maintained by the subscription client corresponding to the blockchain node instead of the cross-chain interaction end. It prevents malicious behaviors of a relevant person towards the cross-chain interaction end, and helps improve reliability in a message transmission process.

In an implementation, the subscription client can verify a message provided by the cross-chain interaction end, to provide the message to the blockchain node after the verification succeeds. Because the blockchain technology is characterized by a distributed ledger, unified ledger data, and tamper-proof data, even though a relevant person may tamper with a message provided by the cross-chain interaction end, reliability of the message can be verified, to eliminate a security risk.

In an implementation, the subscription client can verify the message by using any one or more methods. No limitation is imposed in the present specification. For example, when the message is on the longest chain in the second blockchain and there are at least six blocks following a block that the message is from, the subscription client can determine that the verification on the message succeeds. For another example, the subscription client can verify the message based on the Practical Byzantine Fault Tolerance (PBFT) algorithm. For another example, the subscription client can verify the message by using a predetermined oracle (Oracle).

Figure 3:
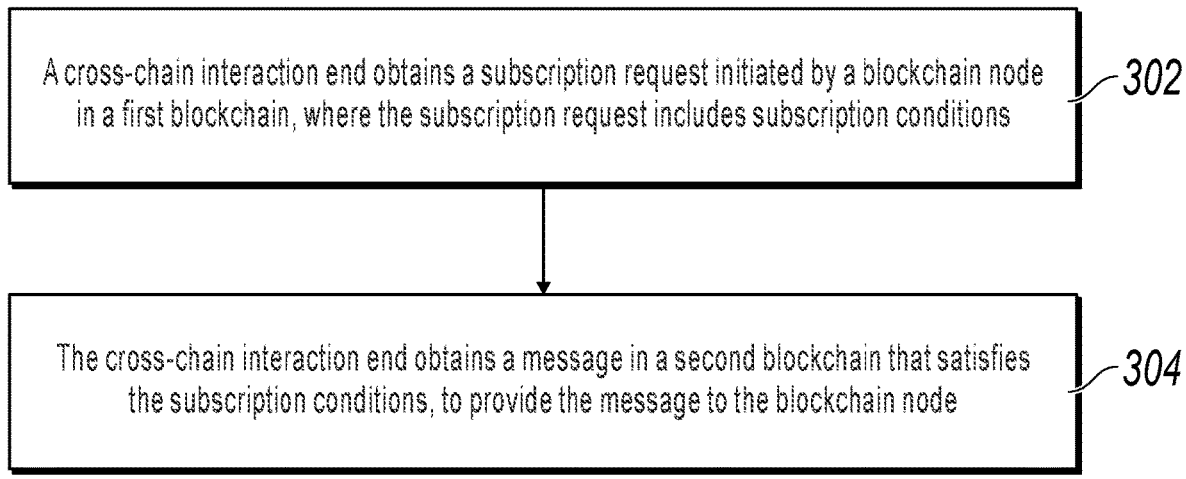
FIG. 3 is a flowchart illustrating still another method for cross-blockchain interaction, according to an example implementation.

FIG. 3 is a flowchart illustrating still another method for cross-blockchain interaction, according to an example implementation. As shown in FIG. 3, the method is applied to a cross-chain interaction end, and can include the steps below.

Step 302. The cross-chain interaction end obtains a subscription request initiated by a blockchain node in a first blockchain, where the subscription request includes subscription conditions.

In an implementation, the cross-chain interaction end can initiate a status query request to a subscription client corresponding to the blockchain node. The subscription client maintains a message queue corresponding to the blockchain node. Then, the cross-chain interaction end receives a queue status of the message queue that is returned by the subscription client, and determines, based on the queue status, whether the message queue includes a message satisfying the subscription conditions. When the message queue includes a message satisfying the subscription conditions, the cross-chain interaction end does not need to repeatedly obtain the message. When the message queue does not includes a message satisfying the subscription conditions, the cross-chain interaction end can obtain the message that is published in a second blockchain and satisfies the subscription conditions, to update the message to the message queue. In other words, both the message queue and the queue status of the message queue are maintained by the subscription client corresponding to the blockchain node instead of the cross-chain interaction end. It prevents malicious behaviors of a relevant person towards the cross-chain interaction end, and helps improve reliability in a message transmission process.

In an implementation, the cross-chain interaction end can initiate, to a publishing client corresponding to a second blockchain, a message acquisition request corresponding to the subscription conditions. The publishing client is configured to maintain messages generated in the second blockchain. Then, the cross-chain interaction end receives a message that is returned by the publishing client and matches the message acquisition request. In other words, the publishing client obtains all publishable messages from the second blockchain, and the messages are stateless messages. That is, the publishing client does not need to maintain a message queue corresponding to the blockchain node in the first blockchain and a queue status of the message queue, but only needs to respond to the message acquisition request initiated by the cross-chain interaction end. It prevents malicious behaviors of a relevant person towards the publishing client, and helps improve reliability in a message transmission process.

Step 304. The cross-chain interaction end obtains a message in a second blockchain that satisfies the subscription conditions, to provide the message to the blockchain node.

In an implementation, the cross-chain interaction end can be configured in the first blockchain, or the cross-chain interaction end can be configured in the second blockchain, or the cross-chain interaction end can be configured on a node independent of the first blockchain and the second blockchain, or the cross-chain interaction end can be configured at another location. No limitation is imposed in the present specification.

Figure 4:
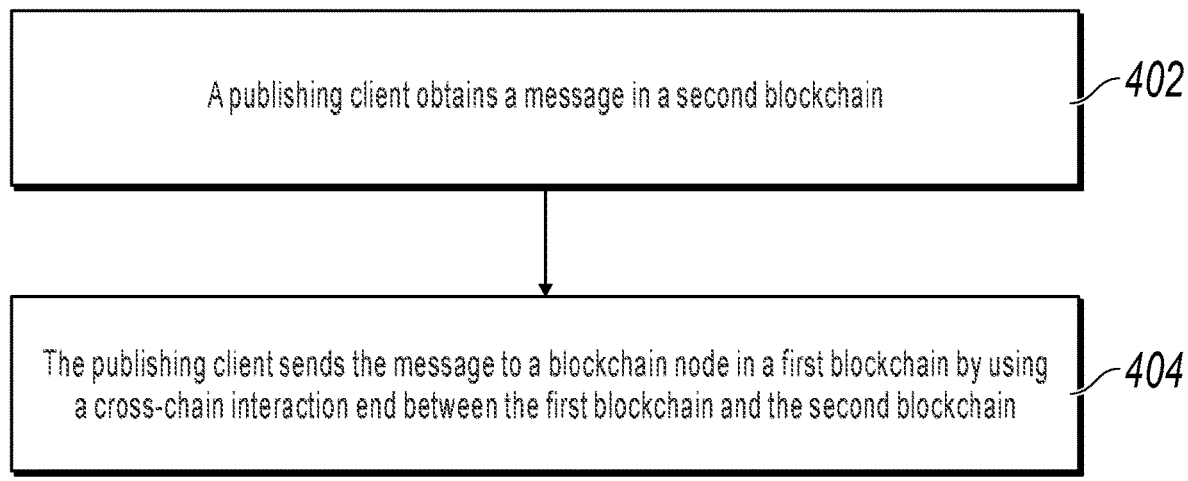
FIG. 4 is a flowchart illustrating yet another method for cross-blockchain interaction, according to an example implementation.

FIG. 4 is a flowchart illustrating yet another method for cross-blockchain interaction, according to an example implementation. As shown in FIG. 4, the method is applied to a publishing client, and can include the steps below.

Step 402. The publishing client obtains a message in a second blockchain.

In an implementation, the publishing client can receive a message acquisition request initiated by a cross-chain interaction end. The message acquisition request is generated by the cross-chain interaction end based on subscription conditions provided by a blockchain node. Then, the publishing client sends, to the cross-chain interaction end, a message that is in the second blockchain and matches the message acquisition request, so that the cross-chain interaction end sends the message to the blockchain node. In other words, the publishing client obtains all publishable messages from the second blockchain, and the messages are stateless messages. That is, the publishing client does not need to maintain a message queue corresponding to the blockchain node in a first blockchain and a queue status of the message queue, but only needs to respond to the message acquisition request initiated by the cross-chain interaction end. It prevents malicious behaviors of a relevant person towards the publishing client, and helps improve reliability in a message transmission process.

Step 404. The publishing client sends the message to a blockchain node in a first blockchain by using a cross-chain interaction end between the first blockchain and the second blockchain.

In an implementation, the cross-chain interaction end can send the message to a subscription client, and the subscription client adds the message to the message queue corresponding to the blockchain node, so that the blockchain node obtains the message and executes a related operation.

In an implementation, all blockchain nodes in the second blockchain can correspond to one publishing client, or blockchain nodes in the second blockchain can each correspond to a plurality of publishing clients. No limitation is imposed in the present specification.

Figure 5:
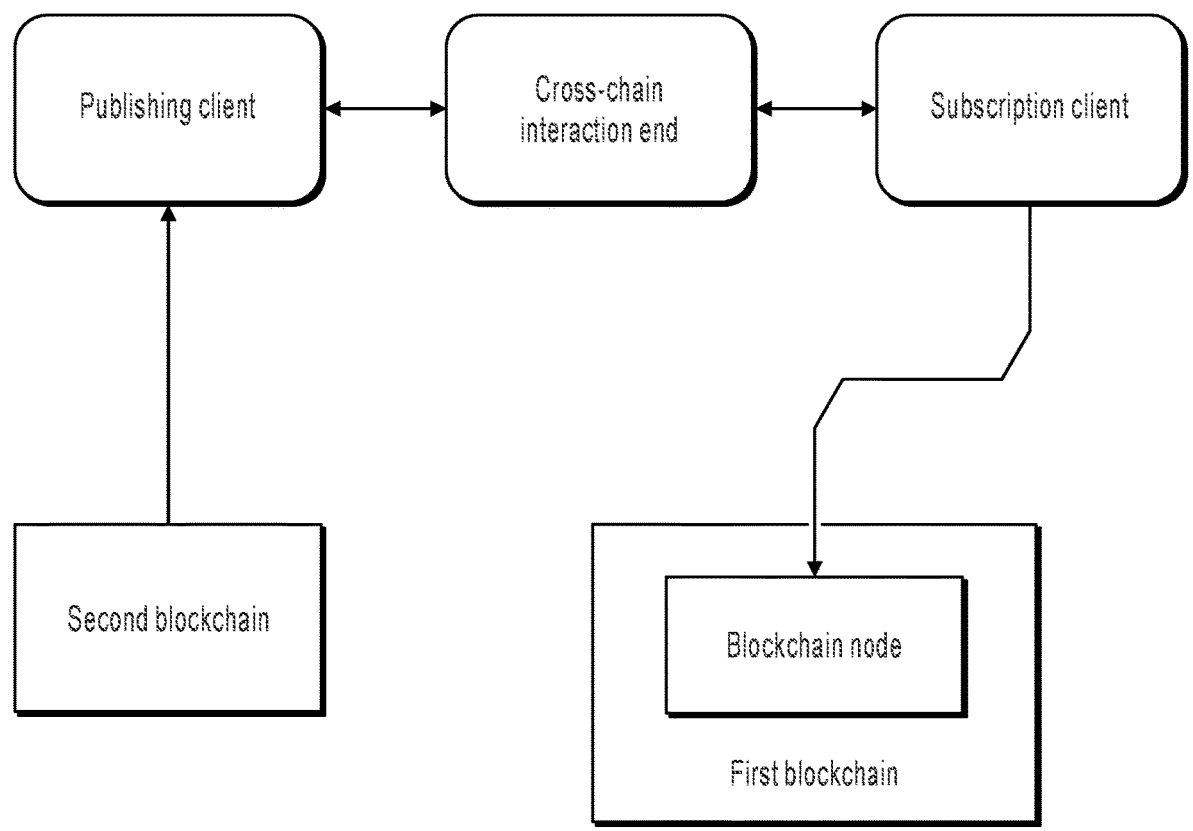
FIG. 5 is a schematic architectural diagram illustrating a system for cross-blockchain interaction, according to an example implementation.

FIG. 5 is a schematic architectural diagram illustrating a system for cross-blockchain interaction, according to an example implementation. As shown in FIG. 5, the system for cross-blockchain interaction can include a first blockchain, a second blockchain, a subscription client, a publishing client, and a cross-chain interaction end.

The first blockchain is a blockchain used as a message subscription party in the present specification, and the second blockchain is a blockchain used as a message publishing party in the present specification. In other words, the "first blockchain" and the "second blockchain" are only used to distinguish between roles played by different blockchains, and a certain blockchain is not limited to the "first blockchain" or the "second blockchain".

The subscription client corresponds to a blockchain node in the first blockchain, and is configured to maintain a message queue corresponding to the blockchain node. The message queue includes messages that the blockchain node subscribes to. In an implementation, the subscription client can be configured on a device, a node, a platform, etc. that is independent of the first blockchain. In another implementation, the subscription client can be configured on the blockchain node in the first blockchain, and it is equivalent to a subscription function extended on the blockchain node based on related technologies.

The publishing client corresponds to the second blockchain, and is configured to obtain and publish a message generated in the second blockchain. Because of the distributed ledger technology of a blockchain, all blockchain nodes in the second blockchain can reach a consensus on maintaining full ledger data of same content, namely, a blockchain ledger, and the publishing client can obtain publishable messages from the blockchain ledger, so that the cross-chain interaction end can obtain the messages. In an implementation, the publishing client can be configured on a device, a node, a platform, etc. that is independent of the second blockchain. In another implementation, the publishing client can be configured on a blockchain node in the second blockchain, and it is equivalent to a publishing function extended on the blockchain node based on related technologies.

The cross-chain interaction end can obtain a subscription request initiated by the blockchain node in the first blockchain. The subscription request includes subscription conditions, to indicate a subscription requirement of the blockchain node. The cross-chain interaction end can initiate a status query request to the subscription client, and determine, based on a queue status of the message queue that is returned by the subscription client, whether the message queue includes a message satisfying the subscription conditions. If including, the cross-chain interaction end does not need to repeatedly obtain the message. If not including, the cross-chain interaction end needs to obtain the message satisfying the subscription conditions from the publishing client. The cross-chain interaction end can request the message satisfying the subscription conditions from the publishing client, and send, to the subscription client, the message returned by the publishing client, to update the message to the message queue, so that the blockchain node in the first blockchain can consume the message. The cross-chain interaction end only transmits a message between the publishing client and the subscription client, and does not need to perform persistence processing on the message. In an implementation, the cross-chain interaction end can be configured on a device, a node, a platform, etc. that is independent of the first blockchain and the second blockchain. In another implementation, the cross-chain interaction end can be configured on the blockchain node in the first blockchain, and it is equivalent to a cross-chain interaction function extended on the blockchain node based on related technologies. In another implementation, the cross-chain interaction end can be configured on the blockchain node in the second blockchain, and it is equivalent to a cross-chain interaction function extended on the blockchain node based on related technologies.

Based on the subscription client, the publishing client, the cross-chain interaction end, etc. in the implementation shown in FIG. 5, the message queue corresponding to the blockchain node in the first blockchain is maintained by the subscription client corresponding to the blockchain node, a consumption status of each message in the message queue by the blockchain node is maintained by the blockchain node, and the cross-chain interaction end, the publishing client, etc. do not need to maintain the consumption status. As such, it prevents the cross-chain interaction end, the publishing client, etc. from providing an incorrect or invalid message to the subscription client.

Figure 6:
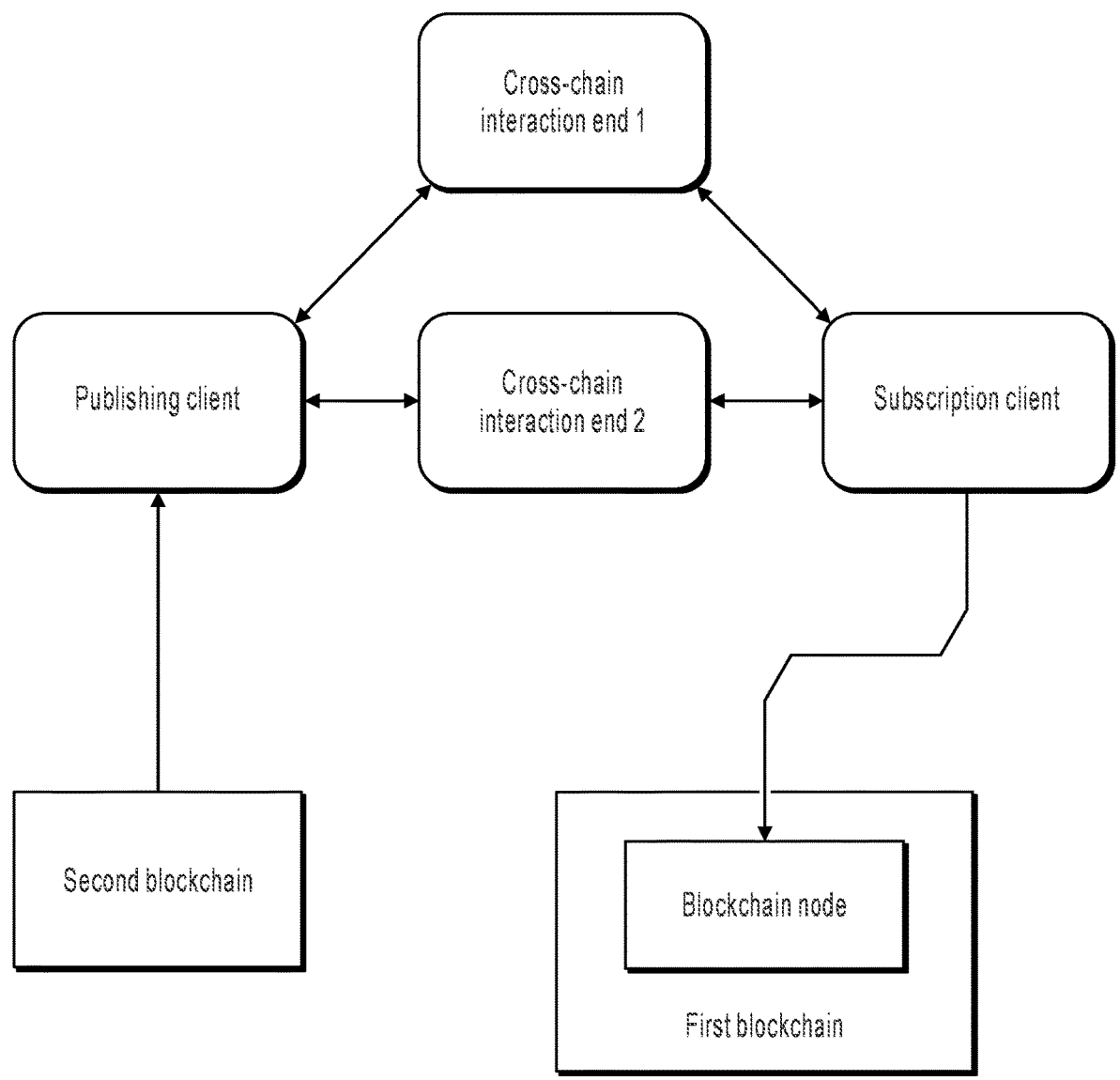
FIG. 6 is a schematic architectural diagram illustrating another system for cross-blockchain interaction, according to an example implementation.

A message provided by the cross-chain interaction end to the subscription client is from the publishing client, and a message provided by the publishing client is from the second blockchain. In addition, because the publishing client does not maintain the queue status of the message queue, the publishing client cannot tamper with message content. Because the subscription client can verify the content based on the blockchain ledger maintained in the second blockchain, it is meaningless for the cross-chain interaction end to tamper with the message content. As such, reliability of the message content is ensured. However, in some situations, the cross-chain interaction end can initiate a denial of service attack, and consequently the subscription client cannot obtain a message published by the publishing client. Therefore, as shown in FIG. 6, a plurality of mutually independent cross-chain interaction ends can be configured between the subscription client and the publishing client, for example, cross-chain interaction end 1 and cross-chain interaction end 2. As such, even though cross-chain interaction end 1 initiates a denial of service attack, the subscription client can obtain, by using cross-chain interaction end 2, the message published by the publishing client.

Figure 7:
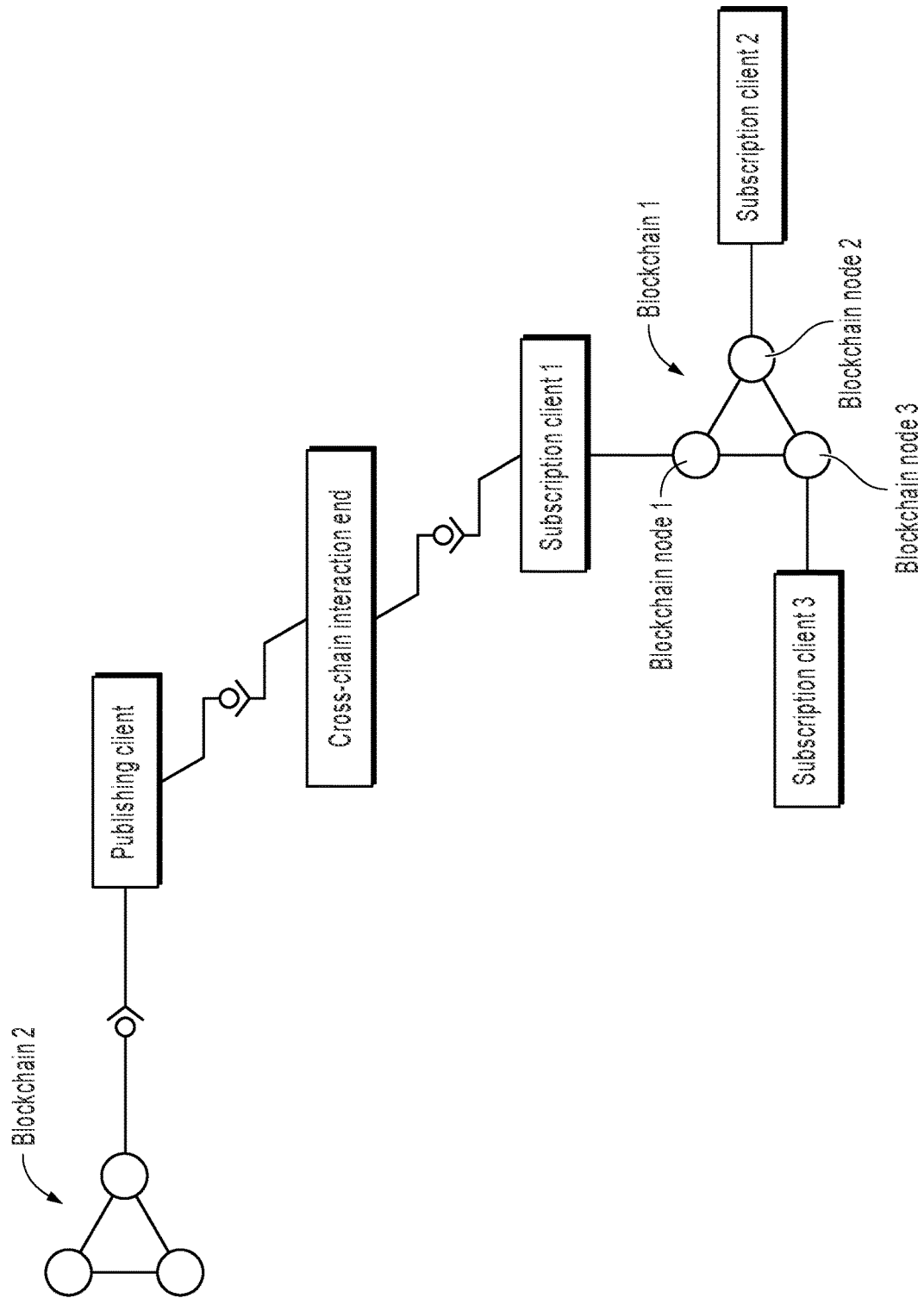
FIG. 7 is a schematic structural diagram illustrating a cross-blockchain associated transfer system, according to an example implementation.

For ease of understanding, technical solutions in one or more implementations of the present specification are described by using cross-blockchain associated transfer as an example. FIG. 7 is a schematic structural diagram illustrating a cross-blockchain associated transfer system, according to an example implementation. As shown in FIG. 7, assume that user A has account A1 in blockchain 1 and account A2 in blockchain 2, and user B has account B1 in blockchain 1 and account B2 in blockchain 2. Account A1 and account B1 in blockchain 1 are used to maintain a certain type of asset object (such as RMB). Account A2 and account B2 in blockchain 2 are used to maintain another type of asset object (such as securities). When user A expects to sell securities to user B, it can be implemented by using the following associated transfer logic: User A transfers a specified quantity of securities from account A2 to account B2, and then user B transfers a specified amount of RMB from account B1 to account A1.

To improve reliability in a transfer process, a corresponding smart contract can be set in each of blockchain 1 and blockchain 2. As such, the previous two transfer processes are automatically completed, and an intentional or negligent false transfer amount, or a delay in a manual transfer process of a user is prevented, to ensure that the transfer process is completed quickly and accurately. Based on the technical solutions in the present specification, cross-blockchain message exchange can be implemented between blockchain 1 and blockchain 2, so that a transfer operation from account B1 to account A1 can be executed in blockchain 1 after blockchain 1 can determine that a transfer operation from account A2 to account B2 has been completed in blockchain 2.

In the implementation shown in FIG. 7, assume that blockchain 1 includes blockchain node 1, blockchain node 2, blockchain node 3, etc. Subscription client 1 is configured on blockchain node 1, subscription client 2 is configured on blockchain node 2, subscription client 3 is configured on blockchain node 3, etc. Subscription clients 1 to 3 are not necessarily configured on blockchain nodes 1 to 3, and can be configured on nodes independent of blockchain 1. No limitation is imposed in the present specification. Subscription client 1 maintains message queue 1 corresponding to blockchain node 1, subscription client 2 maintains message queue 2 corresponding to blockchain node 2, and subscription client 3 maintains message queue 3 corresponding to blockchain node 3. A corresponding publishing client is configured in blockchain 2. The publishing client can be configured on a certain blockchain node in blockchain 2, or can be configured on a node independent of blockchain 2. No limitation is imposed in the present specification. A cross-chain interaction end is configured between subscription clients 1 to 3 and the publishing client. The cross-chain interaction end can be configured on a certain blockchain node in blockchain 1, or can be configured on a certain blockchain node in blockchain 2, or can be configured on a node independent of blockchain 1 and blockchain 2. No limitation is imposed in the present specification.

Figure 8:
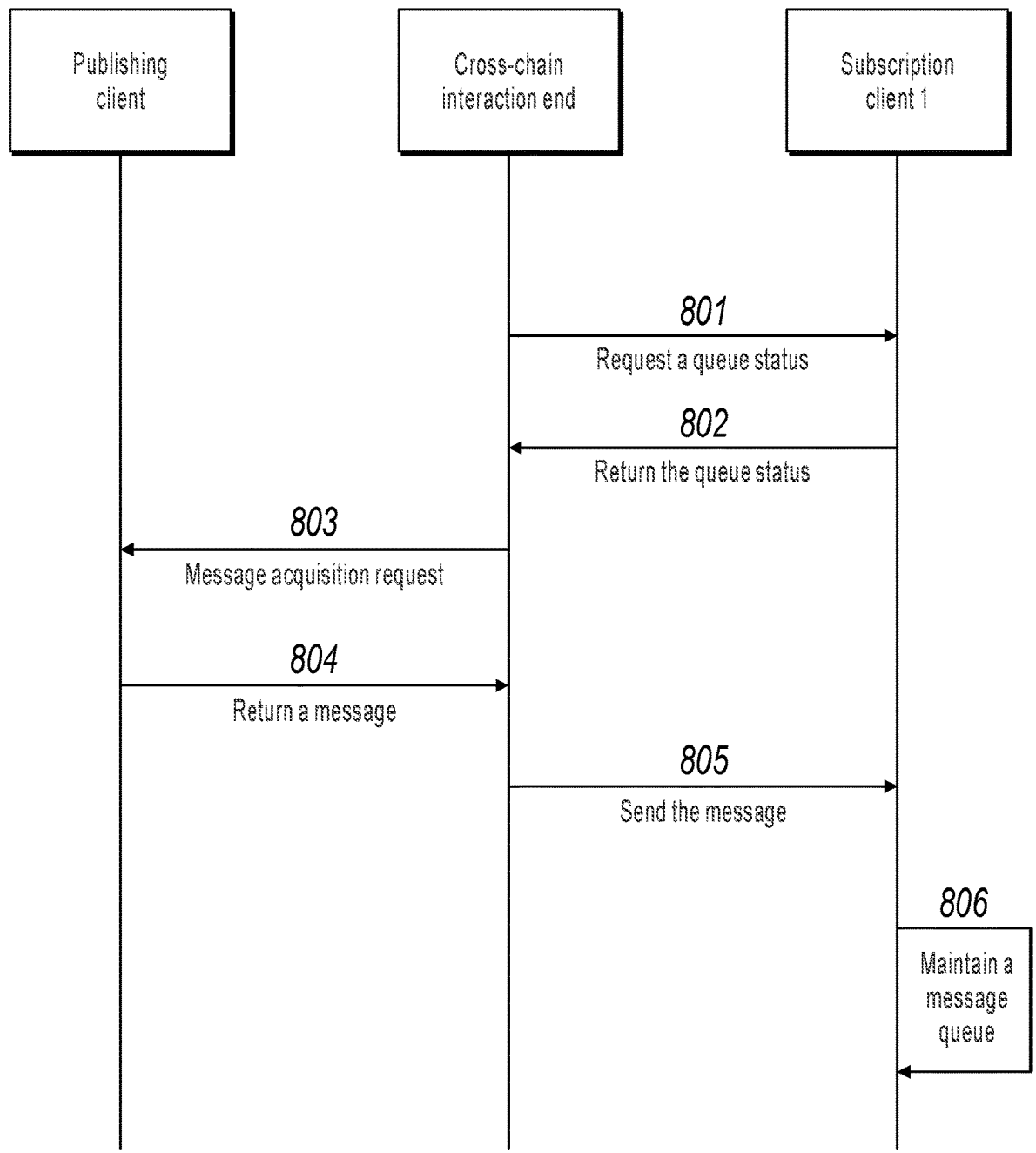
FIG. 8 is a schematic diagram illustrating a cross-blockchain message exchange process, according to an example implementation.

Subscription clients 1 to 3 respectively maintain message queues 1 to 3, and message queues 1 to 3 include messages that blockchain nodes 1 to 3 respectively subscribe to. Subscription clients 1 to 3 can maintain queue statuses of message queues 1 to 3 based on consumption statuses of messages in message queues 1 to 3 respectively by blockchain nodes 1 to 3. The cross-chain interaction end and the publishing client do not need to maintain the queue statuses. The publishing client can obtain all publishable messages in blockchain 2. The cross-chain interaction end can request the queue statuses from subscription clients 1 to 3, and request corresponding messages from the publishing client based on the queue statuses, to update the messages to corresponding message queues. The following uses blockchain node 1 as an example to describe a cross-blockchain message exchange process. FIG. 8 is a schematic diagram illustrating a cross-blockchain message exchange process, according to an example implementation. As shown in FIG. 8, the message exchange process can include the steps below.

Step 801. The cross-chain interaction end requests a queue status from subscription client 1.

Step 802. The cross-chain interaction end receives the queue status returned by subscription client 1.

In an implementation, subscription client 1 maintains a message queue (namely, message queue 1) corresponding to blockchain node 1. The message queue includes messages that blockchain node 1 subscribes to, and the queue status includes a consumption status of each message by blockchain node 1, so that the cross-chain interaction end can know a next message that needs to be obtained from the publishing client.

Specifically, blockchain node 1 initiates a subscription request to the cross-chain interaction end, and the subscription request includes subscription conditions. The previous transfer transaction between user A and user B is used as an example. Assume that the subscription condition is that a specified quantity of securities are successfully transferred from account A2 to account B2. After querying the queue status, the cross-chain interaction end can determine whether the message queue maintained by subscription client 1 includes a message satisfying the subscription conditions, namely, a transaction success message indicating that a specified quantity of securities are transferred from account A2 to account B2. If there is already a message satisfying the subscription conditions, the cross-chain interaction end does not need to repeatedly obtain the message, and determines that the subscription request has been successfully responded to. If there is not a message satisfying the subscription conditions, the cross-chain interaction end can determine that the next message that needs to be obtained is the transaction success message indicating that a specified quantity of securities are transferred from account A2 to account B2. The cross-chain interaction end needs to continue to perform a subsequent step to obtain the next message.

Step 803. The cross-chain interaction end sends a message acquisition request to the publishing client.

In an implementation, the previous transfer transaction between user A and user B is used as an example. Assume that blockchain node 1 subscribes, to blockchain 2, a transaction success message indicating that a specified quantity of securities are transferred from account A2 to account B2. When determining, based on the queue status, that the next message that needs to be obtained is the transaction success message, the cross-chain interaction end can initiate a corresponding message acquisition request to the publishing client, to obtain the transaction success message.

Step 804. The cross-chain interaction end obtains a message returned by the publishing client.

In an implementation, the publishing client can parse the message acquisition request, to determine a message needed by the cross-chain interaction end. If the publishing client has obtained the transaction success message, the publishing client can directly return the message to the cross-chain interaction end. If the publishing client does not obtain the transaction success message, the publishing client can notify the cross-chain interaction end that message acquisition fails, so that the cross-chain interaction end can perform query repeatedly based on a predetermined period, until the publishing client obtains the transaction success message. Alternatively, in some situations, if the publishing client does not obtain the transaction success message, the publishing client can monitor the transaction success message, and actively send the transaction success message to the cross-chain interaction end after the publishing client determines that the transaction success message is obtained.

In an implementation, a transfer operation from account A2 to account B2 in blockchain 2 can be completed by a certain blockchain node in blockchain 2 by invoking a smart contract, or can be completed by automatically triggering a smart contract based on a predefined trigger condition. No limitation is imposed in the present specification.

Step 805. The cross-chain interaction end sends the obtained message to subscription client 1.

In an implementation, the cross-chain interaction end is only responsible for data transmission between subscription client 1 and the publishing client. The cross-chain interaction end neither maintains the message queue and the queue status, nor pays attention to data content. In addition, the cross-chain interaction end does not need to perform persistence processing on data, and is only used as a "pipeline" for data transmission.

Step 806. Subscription client 1 adds the message sent by the cross-chain interaction end to a message queue, to maintain the message queue.

In an implementation, subscription client 1 or blockchain node 1 can verify the received message, to ensure that the message is reliable and is not tampered with. Subscription client 1 or blockchain node 1 can perform verification by using various methods. No limitation is imposed in the present specification. For example, subscription client 1 or blockchain node 1 can check whether a block that the message is from is on the longest chain in blockchain 2, and can check a quantity of blocks following the block. If the block that the message is from is on the longest chain and the quantity of blocks following the block is not less than 6, subscription client 1 or blockchain node 1 can determine that the verification on the message succeeds. For another example, subscription client 1 or blockchain node 1 can verify the message based on the PBFT algorithm or by using an oracle.

Actually, because the blockchain technology is also a distributed ledger technology, it is meaningless for the cross-chain interaction end, the publishing client, or some blockchain nodes in blockchain 2 to tamper with message content, and a reason is that ledger data recorded on a blockchain ledger in blockchain 2 is not affected. As such, it is ensured that subscription client 1 or blockchain node 1 can effectively verify the received message.

In an implementation, assume that a corresponding smart contract is created in advance in blockchain 1. A trigger condition of the smart contract is that the transaction success message is obtained, and content of a contract operation is that a specified amount of RMB is transferred from account B1 to account A1. After obtaining the transaction success message from the message queue maintained by subscription client 1, blockchain node 1 can enable the smart contract to be automatically invoked, and initiate a corresponding contract operation, to automatically transfer a specified amount of RMB from account B1 to account A1. As such, a transfer operation between user A and user B can be reliably completed without a delay (which is a delay caused by a manual operation, excluding normal duration consumed in data transmission and processing).

Figure 9:
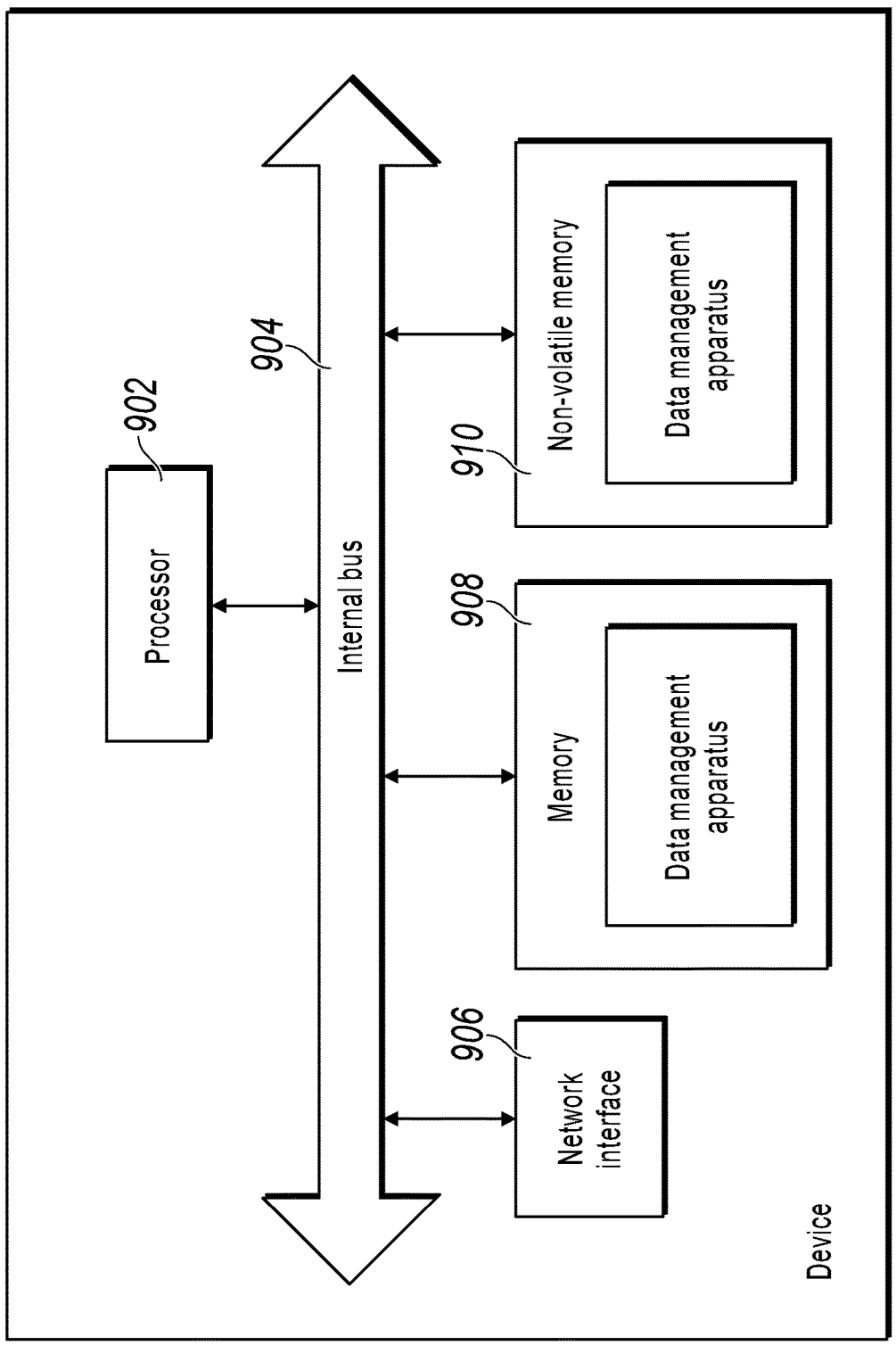
FIG. 9 is a schematic structural diagram illustrating a device, according to an example implementation.

FIG. 9 is a schematic structural diagram illustrating a device, according to an example implementation. As shown in FIG. 9, in terms of hardware, the device includes a processor 902, an internal bus 904, a network interface 906, a memory 908, and a non-volatile memory 910, and certainly can further include hardware needed by other services. The processor 902 reads a corresponding computer program from the non-volatile memory 910 into the memory 908 and then runs the corresponding computer program, to form an apparatus for cross-blockchain interaction in terms of logic. Certainly, in addition to a software implementation, other implementations are not excluded from the one or more implementations of the present specification, for example, a logic device or a combination of hardware and software. That is, an execution body of the following processing procedure is not limited to each logical unit, and can also be hardware or a logic device.

Figure 10:
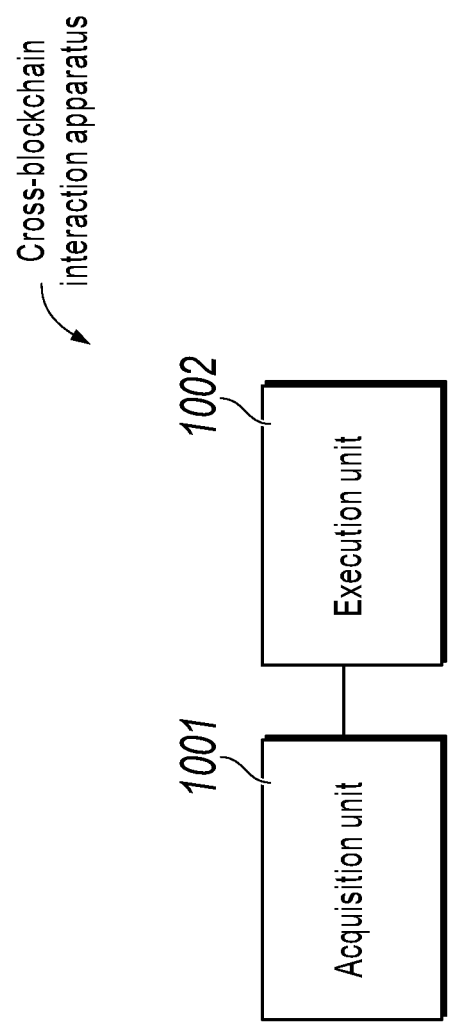
FIG. 10 is a block diagram illustrating an apparatus for cross-blockchain interaction, according to an example implementation.

In an implementation, referring to FIG. 10, in a software implementation, the apparatus for cross-blockchain interaction can include: an acquisition unit 1001, enabling a blockchain node in a first blockchain to obtain a message in a second blockchain by using a cross-chain interaction end between the first blockchain and the second blockchain; and an execution unit 1002, enabling the blockchain node to execute an operation related to the message.

Optionally, the message obtained by the blockchain node includes a message that is published in the second blockchain and satisfies subscription conditions of the blockchain node.

Optionally, the acquisition unit 1001 is specifically configured to enable the blockchain node to initiate a subscription request to the cross-chain interaction end, where the subscription request is used to indicate subscription conditions to the cross-chain interaction end, so that the cross-chain interaction end obtains a message that is published in the second blockchain and satisfies the subscription conditions, to add the message to a message queue maintained by a subscription client corresponding to the blockchain node; and enable the blockchain node to obtain the message in the message queue.

Optionally, the execution unit 1002 is specifically configured to enable the blockchain node to initiate a contract operation related to the obtained message.

Figure 11:
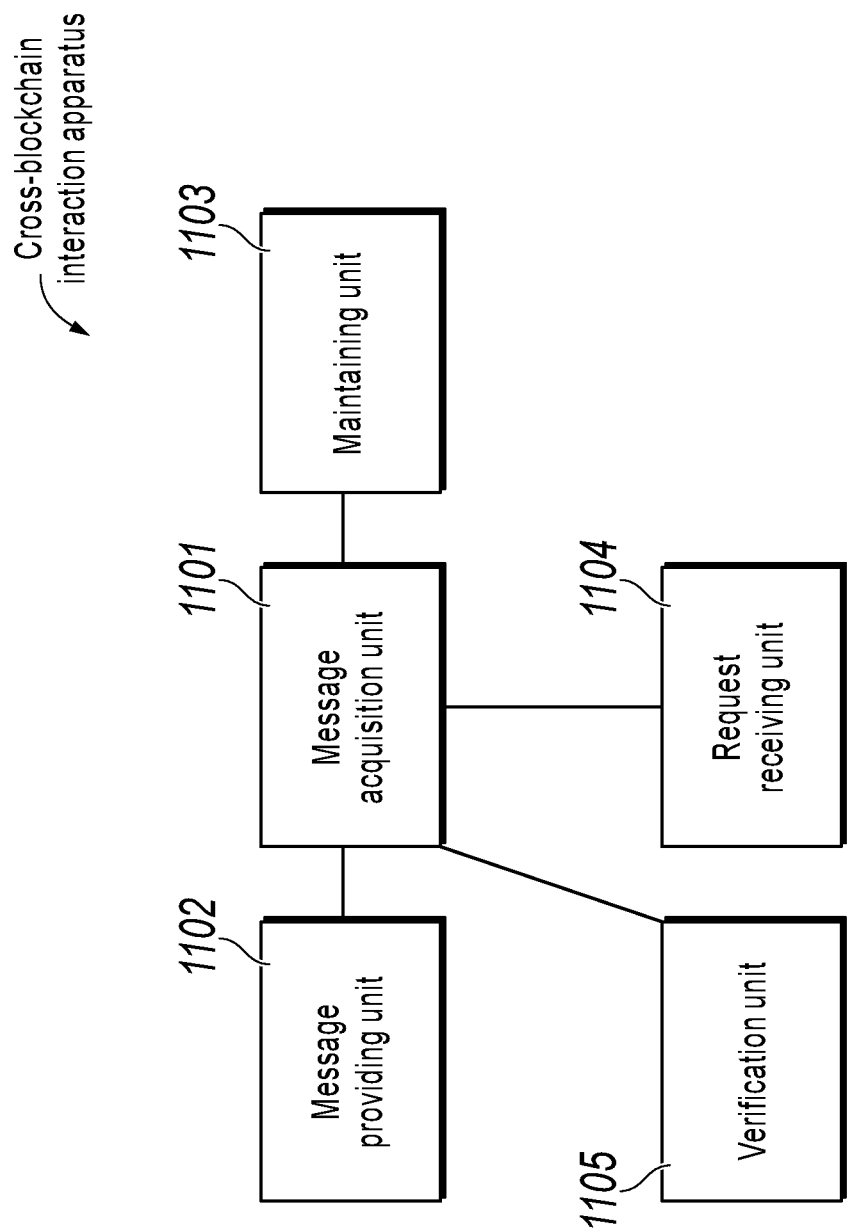
FIG. 11 is a block diagram illustrating another apparatus for cross-blockchain interaction, according to an example implementation.

In another implementation, referring to FIG. 11, in a software implementation, the apparatus for cross-blockchain interaction can include: a message acquisition unit 1101, enabling a subscription client to obtain, by using a cross-chain interaction end between a first blockchain and a second blockchain, a message published in the second blockchain, where the message satisfies subscription conditions provided by a blockchain node in the first blockchain to the cross-chain interaction end; and a message providing unit 1102, enabling the subscription client to provide the message to the blockchain node.

Optionally, the message providing unit 1102 is specifically configured to enable the subscription client to add the obtained message to a message queue corresponding to the blockchain node, so that the blockchain node obtains the message from the message queue.

Optionally, the apparatus further includes a maintaining unit 1103, enabling the subscription client to maintain a queue status of the message queue.

The message acquisition unit 1101 is specifically configured to enable the subscription client to send the queue status to the cross-chain interaction end, so that the cross-chain interaction end obtains a message that is published in the second blockchain and satisfies the subscription conditions when the cross-chain interaction end determines, based on the queue status, that the message queue does not include a message satisfying the subscription conditions.

Optionally, the apparatus further includes a request receiving unit 1104, enabling the subscription client to receive a status query request initiated by the cross-chain interaction end.

The message acquisition unit 1101 enables the subscription client to return the queue status to the cross-chain interaction end in response to the status query request.

Optionally, the apparatus further includes a verification unit 1105, enabling the subscription client to verify a message provided by the cross-chain interaction end, to provide the message to the blockchain node after the verification succeeds.

Optionally, the subscription client is configured on the blockchain node.

Figure 12:
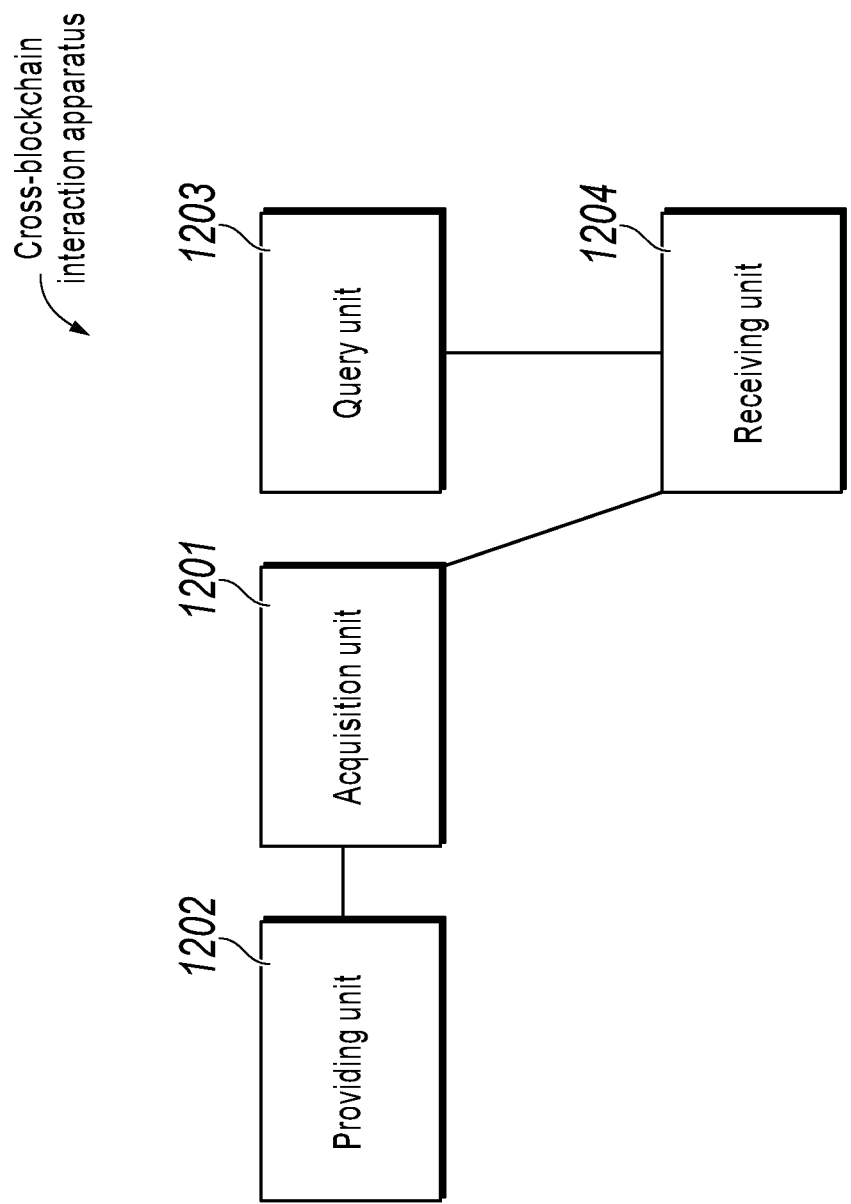
FIG. 12 is a block diagram illustrating still another apparatus for cross-blockchain interaction, according to an example implementation.

In still another implementation, referring to FIG. 12, in a software implementation, the apparatus for cross-blockchain interaction can include: an acquisition unit 1201, enabling a cross-chain interaction end to obtain a subscription request initiated by a blockchain node in a first blockchain, where the subscription request includes subscription conditions; and a providing unit 1202, enabling the cross-chain interaction end to obtain a message in a second blockchain that satisfies the subscription conditions, to provide the message to the blockchain node.

Optionally, the apparatus further includes: a query unit 1203, enabling the cross-chain interaction end to initiate a status query request to a subscription client corresponding to the blockchain node, where the subscription client maintains a message queue corresponding to the blockchain node; and a receiving unit 1204, enabling the cross-chain interaction end to receive a queue status of the message queue that is returned by the subscription client, so that the cross-chain interaction end obtains the message in the second blockchain that satisfies the subscription conditions when the cross-chain interaction end determines, based on the queue status, that the message queue does not include a message satisfying the subscription conditions.

Optionally, the acquisition unit 1201 is specifically configured to enable the cross-chain interaction end to initiate, to a publishing client corresponding to the second blockchain, a message acquisition request corresponding to the subscription conditions, where the publishing client is configured to maintain messages generated in the second blockchain; and enable the cross-chain interaction end to receive a message that is returned by the publishing client and matches the message acquisition request.

Optionally, the cross-chain interaction end is configured in the first blockchain, or the cross-chain interaction end is configured in the second blockchain, or the cross-chain interaction end is configured on a node independent of the first blockchain and the second blockchain.

Figure 13:
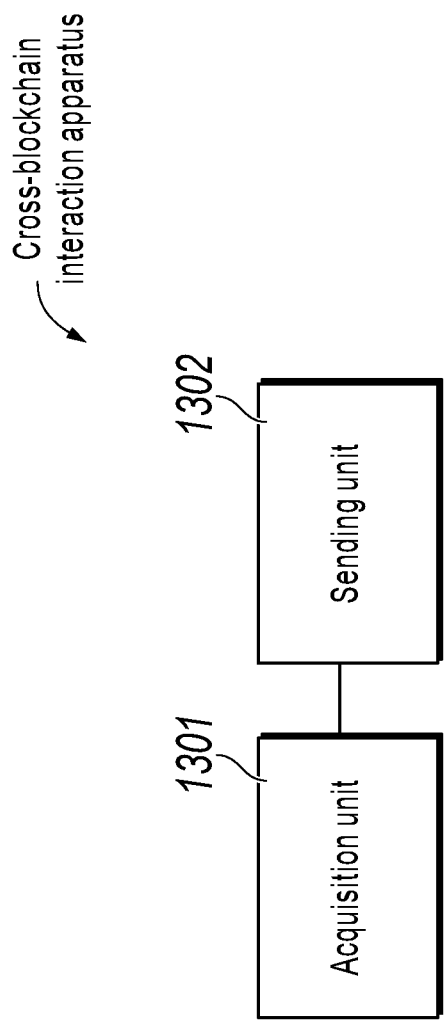
FIG. 13 is a block diagram illustrating yet another apparatus for cross-blockchain interaction, according to an example implementation.

In yet another implementation, referring to FIG. 13, in a software implementation, the apparatus for cross-blockchain interaction can include: an acquisition unit 1301, enabling a publishing client to obtain a message in a second blockchain; and a sending unit 1302, enabling the publishing client to send the message to a blockchain node in a first blockchain by using a cross-chain interaction end between the first blockchain and the second blockchain.

Optionally, the acquisition unit 1301 is specifically configured to enable the publishing client to receive a message acquisition request initiated by the cross-chain interaction end, where the message acquisition request is generated by the cross-chain interaction end based on subscription conditions provided by the blockchain node; and enable the publishing client to send, to the cross-chain interaction end, a message that is in the second blockchain and matches the message acquisition request, so that the cross-chain interaction end sends the message to the blockchain node.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that store information by using any method or technology. The information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a quantum storage, a grapheme-based storage medium, another magnetic storage device, or any other non-transmission medium. The computer storage medium can be used to store information that can be accessed by the computing device. Based on the definition in the present specification, the computer readable medium does not include transitory media (transitory media), for example, a modulated data signal and carrier.

It is worthwhile to further note that the terms "include", "comprise", or their any other variant is intended to cover a non-exclusive inclusion, so that a process, a method, a product, or a device that includes a list of elements not only includes those elements but also includes other elements which are not expressly listed, or further includes elements inherent to such a process, a method, a product, or a device. An element preceded by "includes a . . . " does not, without more constraints, preclude the existence of additional identical elements in the process, method, product, or device that includes the element.

Specific implementations of the present specification are described above. Other implementations fall within the scope of the appended claims. In some situations, the actions or steps described in the claims can be performed in an order different from the order in the implementation and the desired results can still be achieved. In addition, the process provided in the accompanying drawings does not necessarily require a particular execution order to achieve the desired results. In some implementations, multi-tasking and parallel processing can be advantageous.

The terms used in one or more implementations of the present specification are only for the purpose of describing specific implementations, and are not intended to limit one or more implementations of the present specification. The terms "a" and "the" of singular forms used in the implementations and the appended claims of the present specification are also intended to include plural forms, unless otherwise specified in the context clearly. It should also be understood that, the term "and/or" used in the present specification indicates and includes any or all possible combinations of one or more associated listed items.

It should be understood that, although terms "first", "second", "third", etc. can be used to describe various information in the one or more implementations of the present specification, the information is not limited to the terms. These terms are only used to distinguish between information of a same type. For example, without departing from the scope of the one or more implementations of the present specification, first information can also be referred to as second information, and similarly, the second information can also be referred to as the first information. Depending on the context, for example, the word "if" used here can be explained as "while", "when", or "in response to determining".

The previous descriptions are only example implementations in one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

Figure 14:
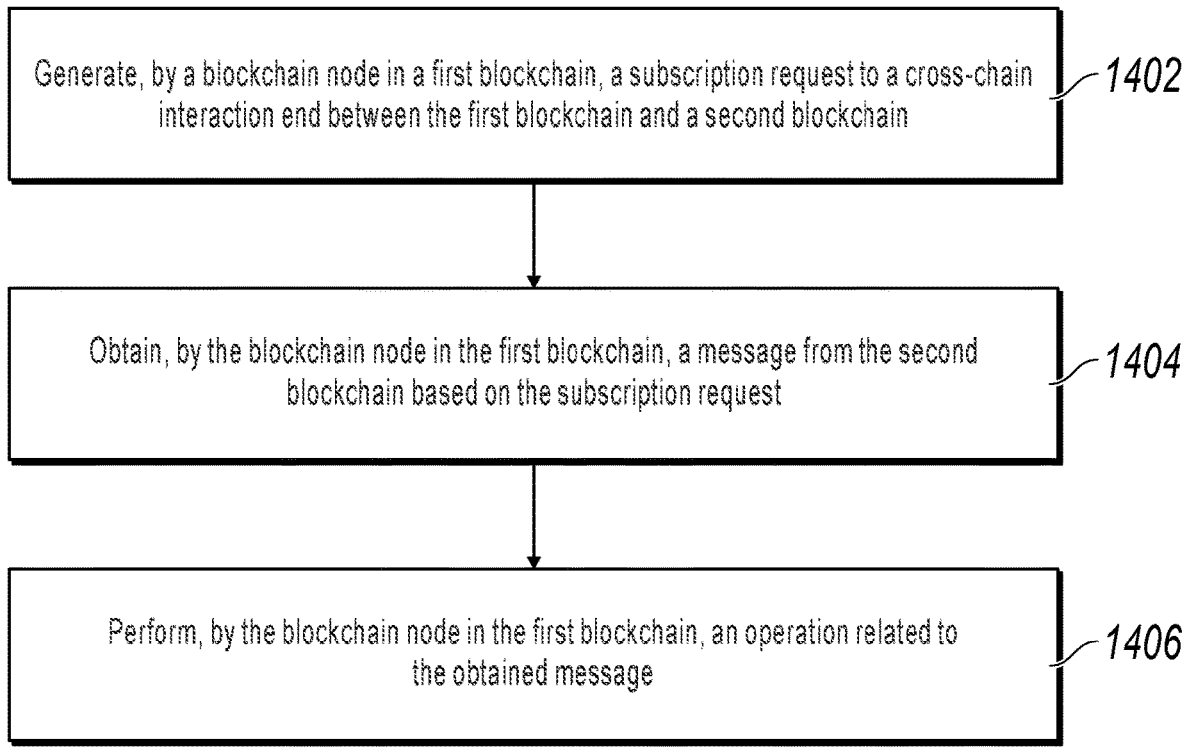
FIG. 14 is a flowchart illustrating an example of a computer-implemented method for cross-blockchain interaction, according to an implementation of the present disclosure.

FIG. 14 is a flowchart illustrating an example of a computer-implemented method 1400 for cross-blockchain interaction, according to an implementation of the present disclosure. For clarity of presentation, the description that follows generally describes method 1400 in the context of the other figures in this description. However, it will be understood that method 1400 can be performed, for example, by any system, environment, software, and hardware, or a combination of systems, environments, software, and hardware, as appropriate. In some implementations, various steps of method 1400 can be run in parallel, in combination, in loops, or in any order.

In general, FIG. 14 illustrates a solution to allow a first blockchain to obtain messages from a second blockchain using a cross-chain interaction end between the first blockchain and the second blockchain. The cross-chain interaction end can exist or can be disposed between the first and second blockchain to allow messages to be exchanged between the two blockchains. Further, additional blockchains can use additional or the same cross-chain interaction end to allow for communications between a plurality of blockchains. It is noted that the first blockchain may be any blockchain receiving a message, while the second blockchain as used herein represents a blockchain providing the message to another blockchain in a cross-chain interaction. Different blockchains can thus be first or second blockchains as described herein, depending on the direction of a particular message.

In some instances, the second blockchain (i.e., where messages originate or are published from) can publish a message in the second blockchain. The first blockchain may, in some instances, be associated with a set of subscription conditions that define when a particular message from another blockchain—here, the second blockchain—satisfy those conditions. The cross-chain interaction end can be used to implement those subscription conditions. In response to the determination that a particular subscription condition is satisfied, the cross-chain interaction end can obtain the message from the second blockchain that satisfies the particular subscription condition, and can assist in providing that obtained message to the first blockchain. In doing so, a large quantity of blockchain nodes in a blockchain can be coordinated based on subscription conditions monitored in one or more other blockchains.

In some instances, the cross-chain interaction end may be associated with a subscription client, where the subscription client provides message subscription functions to allow specific subscription conditions to be monitored at particular nodes in a blockchain When particular ones of those subscription conditions are monitored and determined to be satisfied by particular messages, the subscription client can obtain those messages in connection or combination with the cross-chain interaction end and can allow for a cross-chain process of providing those messages to the corresponding blockchains associated with those conditions. In some instances, a subscription client may be associated with a single blockchain node, while in others, a particular subscription client may be associated with and maintain corresponding functionality for a plurality of blockchain nodes. Any number of subscription clients can be included in or associated with different blockchains.

In some instances, the subscription client can maintain one or more message queues corresponding to their associated blockchain nodes. In some instances, the subscription client can also maintain a queue status with the one or more message queues, and can provide (or otherwise make accessible) the queue status of particular message queues to the corresponding cross-chain interaction ends; allowing the cross-chain interaction ends to determine if any messages from the corresponding message queue should be obtained.

In some instances, one or more publishing clients may be used in an inverse or opposite manner as the subscription clients, in that one or more message acquisition requests corresponding to the subscription conditions can be provided to a publishing client associated with a particular blockchain node of the second blockchain. The publishing client can analyze messages generated within the second blockchain to determine whether those messages match the subscription conditions. If satisfying those conditions, the publishing client can send a notification or message to the cross-chain interaction end to allow that message to be returned or provided to the first blockchain. In doing so with a publication client, no message queues may be necessary as any relevant messages can be sent or provided to the cross-chain interaction end upon discovery or detection by the publication client. This solution can prevent malicious behaviors of a relevant person towards the publishing client, and can improve reliability in a message transmission process. In some instances, both a publishing client and a subscription client may be used in the same combination of interactions.

Turning to the particular implementation of FIG. 14, at 1402, a subscription request can be generated to a cross-chain interaction end between the first blockchain and a second blockchain by, or associated with, a blockchain node in a first blockchain. From 1402, method 1400 proceeds to 1404.

At 1404, a message from the second blockchain is obtained by a blockchain node in the first blockchain based on the subscription request. From 1404, method 1400 proceeds to 1406.

In some instances, the message obtained by the blockchain node in the second blockchain comprises a message that is published in the second blockchain that satisfies one or more subscription conditions of the first blockchain node, such as those defined within the subscription request.

In some instances, the subscription request is used to indicate one or more subscription conditions to the cross-chain interaction end. Using, or based on, the subscription request, the cross-chain interaction end obtains a message that is published in the second blockchain that satisfies the subscription conditions. The obtained message can then be added to a message queue maintained by a subscription client corresponding to the blockchain node of the first blockchain.

At 1406, an operation related to the message is performed by the blockchain node in the first blockchain.

In some instances, performing the operation related to the message can include initiating, by the blockchain node of the first blockchain node, a contract operation related to the obtained message. For example, the contract operation may include a new operation to be performed, such as sending an amount of money to a new recipient. The contract operation may be associated with a smart contract, such that the corresponding contract operation is automatically initiated when the obtained message is received at the blockchain node of the first blockchain. For transfers between different accounts, each associated with the different blockchains, transfer operations between users associated with different blockchains can be reliably completed without a delay (for example, from manual operation, excluding normal duration consumed in data transmission and processing). After 1406, method 1400 can stop.

In some instances of method 1400, the blockchain node of the first blockchain corresponds to a subscription client. In those instances, the subscription client can maintain a queue status of the message queue. In those instances, obtaining the message may include sending, by the subscription client, the queue status to the cross-chain interaction end. The cross-chain interaction end can obtain a message that is published in the second blockchain that satisfies the subscription conditions when the cross-chain interaction end determines, based on the queue status, that the message queue does not include a message satisfying the subscription conditions. As noted previously, the subscription request can comprise the one or more subscription conditions. In some instances, the subscription conditions comprise a one-to-one mapping relationship between subscription clients and blockchain nodes.

In some instances, the second blockchain corresponds to a publishing client.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
generating, by a first blockchain node in a first blockchain, a subscription request to a cross-chain interaction end between the first blockchain and a second blockchain;
obtaining, by a second blockchain node, a message from the second blockchain based on the subscription request, the message being published in the second blockchain and satisfying subscription conditions of the second blockchain node; and
performing, by the second blockchain node, an operation related to the obtained message,
wherein the subscription request indicates the subscription conditions to the cross-chain interaction end, so that the cross-chain interaction end obtains and adds the message to a message queue maintained by a subscription client corresponding to the second blockchain node.

2. The computer-implemented method of claim 1, wherein the first blockchain node of the first blockchain corresponds to a subscription client.

3. The computer-implemented method of claim 2, further comprising:

maintaining, by the subscription client, a queue status of the message queue.

4. The computer-implemented method of claim 3, wherein obtaining the message comprises:
sending, by the subscription client, the queue status to the cross-chain interaction end, so that the cross-chain interaction end obtains a message that is published in the second blockchain and satisfies the subscription conditions when the cross-chain interaction end determines, based on the queue status, that the message queue does not comprise a message satisfying the subscription conditions.

5. The computer-implemented method of claim 1, wherein the subscription conditions comprise a one-to-one mapping relationship between subscription clients and blockchain nodes.

6. The computer-implemented method of claim 1, wherein performing, by the second blockchain node, an operation related to the obtained message comprises:
initiating, by the second blockchain node, a contract operation related to the obtained message.

7. The computer-implemented method of claim 1, wherein the second blockchain corresponds to a publishing client.

8. A non-transitory, computer-readable medium storing one or more instructions executable by a computer system to perform operations comprising:
generating, by a first blockchain node in a first blockchain, a subscription request to a cross-chain interaction end between the first blockchain and a second blockchain;
obtaining, by a second blockchain node, a message from the second blockchain based on the subscription request, the message being published in the second blockchain and satisfying subscription conditions of the second blockchain node; and
performing, by the second blockchain node, an operation related to the obtained message,
wherein the subscription request indicates the subscription conditions to the cross-chain interaction end, so that the cross-chain interaction end obtains and adds the message to a message queue maintained by a subscription client corresponding to the second blockchain node.

9. The non-transitory, computer-readable medium of claim 8, wherein the first blockchain node of the first blockchain corresponds to a subscription client.

10. The non-transitory, computer-readable medium of claim 9, the operations further comprising:
maintaining, by the subscription client, a queue status of the message queue; and
wherein obtaining the message comprises:
sending, by the subscription client, the queue status to the cross-chain interaction end, so that the cross-chain interaction end obtains a message that is published in the second blockchain and satisfies the subscription conditions when the cross-chain interaction end determines, based on the queue status, that the message queue does not comprise a message satisfying the subscription conditions.

11. The non-transitory, computer-readable medium of claim 8, wherein performing, by the second blockchain node, an operation related to the obtained message comprises:

initiating, by the second blockchain node, a contract operation related to the obtained message.

12. The non-transitory, computer-readable medium of claim 8, wherein the subscription conditions comprise a one-to-one mapping relationship between subscription clients and blockchain nodes.

13. The non-transitory, computer-readable medium of claim 8, wherein the second blockchain corresponds to a publishing client.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
generating, by a first blockchain node in a first blockchain, a subscription request to a cross-chain interaction end between the first blockchain and a second blockchain;
obtaining, by a second blockchain node, a message from the second blockchain based on the subscription request, the message being published in the second blockchain and satisfying subscription conditions of the second blockchain node; and
performing, by the second blockchain node, an operation related to the obtained message,
wherein the subscription request indicates the subscription conditions to the cross-chain interaction end, so that the cross-chain interaction end obtains and adds the message to a message queue maintained by a subscription client corresponding to the second blockchain node.

15. The computer-implemented system of claim 14, wherein the first blockchain node of the first blockchain corresponds to a subscription client.

16. The computer-implemented system of claim 15, the operations further comprising:
maintaining, by the subscription client, a queue status of the message queue; and wherein obtaining the message comprises:
sending, by the subscription client, the queue status to the cross-chain interaction end, so that the cross-chain interaction end obtains a message that is published in the second blockchain and satisfies the subscription conditions when the cross-chain interaction end determines, based on the queue status, that the message queue does not comprise a message satisfying the subscription conditions.

17. The computer-implemented system of claim 14, wherein performing, by the second blockchain node, an operation related to the obtained message comprises operations of:
initiating, by the second blockchain node, a contract operation related to the obtained message.

18. The computer-implemented system of claim 14, wherein the second blockchain corresponds to a publishing client.

19. The computer-implemented system of claim 14, wherein the subscription conditions comprise a one-to-one mapping relationship between subscription clients and blockchain nodes.

* * * * *